United States Patent
Betsuin et al.

(10) Patent No.: US 12,095,384 B2
(45) Date of Patent: Sep. 17, 2024

(54) DIRECT-CURRENT POWER SUPPLY APPARATUS AND METHOD OF CONTROLLING THE SAME

(71) Applicant: Mitsubishi Electric Corporation, Tokyo (JP)

(72) Inventors: Toshiki Betsuin, Tokyo (JP); Kazunori Sakanobe, Tokyo (JP); Shingo Taninaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 247 days.

(21) Appl. No.: 17/911,810

(22) PCT Filed: May 25, 2020

(86) PCT No.: PCT/JP2020/020527
§ 371 (c)(1),
(2) Date: Sep. 15, 2022

(87) PCT Pub. No.: WO2021/240597
PCT Pub. Date: Dec. 2, 2021

(65) Prior Publication Data
US 2023/0179112 A1    Jun. 8, 2023

(51) Int. Cl.
*H02M 7/217*    (2006.01)
*H02M 1/08*    (2006.01)

(52) U.S. Cl.
CPC ........... *H02M 7/217* (2013.01); *H02M 1/083* (2013.01)

(58) Field of Classification Search
CPC ............................ H02M 7/217; H02M 1/083
See application file for complete search history.

(56) References Cited

U.S. PATENT DOCUMENTS

| | | |
|---|---|---|
| 5,479,336 A | 12/1995 | Motoki et al. |
| 2010/0061128 A1 | 3/2010 | Nakamoto et al. |
| | (Continued) | |

FOREIGN PATENT DOCUMENTS

| | | |
|---|---|---|
| JP | 2763479 B2 | 6/1998 |
| JP | 2003-284343 A | 10/2003 |
| | (Continued) | |

OTHER PUBLICATIONS

International Search Report of the International Searching Authority mailed Aug. 18, 2020 in corresponding International application No. PCT/JP2020/020527 (and English translation).

*Primary Examiner* — Harry R Behm
(74) *Attorney, Agent, or Firm* — Posz Law Group, PLC

(57) ABSTRACT

A direct-current power supply apparatus includes a rectifier circuit that rectifies a power-supply voltage output from an alternating-current power supply, a smoothing capacitor that smooths an output voltage of the rectifier circuit and outputs a direct-current voltage, a switch connected between an output side of the rectifier circuit and an input side of the smoothing capacitor, a zero crossing detector that detects a zero crossing point of the power-supply voltage, and a controller. The controller includes an adjustment circuitry that sets a switching period such that timing of an on switching operation of the switch falls between a zero crossing period that is a period for the zero crossing point detected by the zero crossing detector, and a zero crossing average period, and a switch control circuitry that outputs an on signal to the switch in accordance with the switching period set by the adjustment circuitry.

6 Claims, 6 Drawing Sheets

(56) References Cited

U.S. PATENT DOCUMENTS

2020/0403525 A1* 12/2020 Miyazaki ............ H02M 1/0085
2021/0367502 A1* 11/2021 Yokum ............... H02M 5/2932

FOREIGN PATENT DOCUMENTS

| JP | 2008-253102 A | | 10/2008 |
|----|---------------|---|---------|
| JP | 2010-207018 A | | 9/2010 |
| JP | 2011-097765 A | | 5/2011 |
| JP | 2013005548 A | * | 1/2013 |

* cited by examiner

DIRECT-CURRENT POWER SUPPLY APPARATUS AND METHOD OF CONTROLLING THE SAME

CROSS REFERENCE TO RELATED APPLICATION

This application is a U.S. national stage application of International Patent Application No. PCT/JP2020/020527 filed on May 25, 2020, the disclosure of which is incorporated herein by reference.

TECHNICAL FIELD

The present disclosure relates to a direct-current power supply apparatus connected to an alternating-current power supply and a method of controlling the direct-current power supply apparatus.

BACKGROUND

In the related art, there is a direct-current power supply apparatus including a zero crossing detector that detects a zero crossing point of an alternating-current voltage, a rectifier circuit that subjects the alternating-current voltage to full-wave rectification, a switch unit connected between input ends of the rectifier circuit, a smoothing capacitor connected between output ends of the rectifier circuit, and a control unit (for example, see Patent Literature 1). The control unit stores a switch pattern, which is a combination of a delay time period from the zero crossing point to the start of a short circuit created by the switch unit and a short-circuit time period, to deal with multiple types of loads and selects a switch pattern suited for a load connected in parallel with an output end of the smoothing capacitor.

PATENT LITERATURE

Patent Literature 1: Japanese Unexamined Patent Application Publication No. 2010-207018

A frequency of an alternating-current voltage supplied from an alternating-current power supply is not necessarily a fixed frequency. For example, when a power generator is used as the alternating-current power supply, a frequency of an alternating-current voltage supplied from the power generator varies depending on the rotation frequency of a motor of the power generator, and thus the frequency may sometimes vary. In this case, a period between zero crossing points is unstable, and, in some cases, timing of the zero crossing points varies suddenly.

Furthermore, in some cases, a variation in the period between zero crossing points is caused not only by an anomaly in the frequency of the alternating-current voltage but also by a distortion generated in the alternating-current voltage. For example, when a plurality of direct-current power supply apparatuses perform short-circuit operation of their switches at the same time in a case where the plurality of direct-current power supply apparatuses are connected to the same power supply system, a large short-circuit current flows, and a distortion is sometimes generated in an alternating-current voltage by a voltage drop, for example, due to power supply impedance.

When the direct-current power supply apparatus disclosed in Patent Literature 1 controls the switch unit with reference to a zero crossing point for which the period has varied, a start time when the switch unit creates a short circuit and a short-circuit time period do not match a switch pattern suited for a load. This causes a deviation of short-circuit operation of the switch unit from the suited switch pattern, and there is a possibility of an excessive rise or an insufficient rise in a direct-current voltage to be output from the direct-current power supply apparatus. As a result, the direct-current power supply apparatus is unable to output a stable direct-current voltage.

SUMMARY

To address the above-described issues, the present disclosure provides a direct-current power supply apparatus that outputs a stable direct-current voltage even when a period between zero crossing points of an alternating-current power supply varies and a method of controlling the direct-current power supply apparatus.

A direct-current power supply apparatus according to one embodiment of the present disclosure includes a rectifier circuit configured to rectify a power-supply voltage output from an alternating-current power supply, a smoothing capacitor configured to smooth an output voltage of the rectifier circuit and output a direct-current voltage, a switch connected between an output side of the rectifier circuit and an input side of the smoothing capacitor, a zero crossing detector configured to detect a zero crossing point of the power-supply voltage, and a controller configured to generate, on the basis of a zero crossing period that is a period for the zero crossing point detected by the zero crossing detector, an on signal that is a control signal that causes the switch to perform an on switching operation. The controller includes an adjustment circuitry configured to set a switching period that is a period of the on signal such that timing of the on switching operation of the switch falls between the zero crossing period and a zero crossing average period that is an average value of a plurality of the zero crossing periods detected in a predetermined fixed time period, and a switch control circuitry configured to output the on signal to the switch in accordance with the switching period set by the adjustment circuitry.

According to another embodiment of the present disclosure, there is provided a method of controlling a direct-current power supply apparatus including a rectifier circuit configured to rectify a power-supply voltage output from an alternating-current power supply, a smoothing capacitor configured to smooth an output voltage of the rectifier circuit and output a direct-current voltage, a switch connected between an output side of the rectifier circuit and an input side of the smoothing capacitor, and a zero crossing detector configured to detect a zero crossing point of the power-supply voltage. The method includes setting a switching period that is a period of an on signal that causes the switch to perform an on switching operation such that timing of the on switching operation of the switch falls between a zero crossing period that is a period for the zero crossing point detected by the zero crossing detector, and a zero crossing average period that is an average value of a plurality of the zero crossing periods detected in a predetermined fixed time period, and outputting the on signal to the switch in accordance with the set switching period.

In an embodiment of the present disclosure, the switching period is set such that the timing of the on switching operation of the switch falls between the zero crossing period based on detection values of the zero crossing detector and the zero crossing average period. Thus, even when timing of zero crossing points varies, the influence of a variation in the timing of zero crossing points on the direct-current voltage is reduced. As a result, the likelihoods of an excessive rise and an insufficient rise in the direct-current voltage are reduced, and a stable direct-current voltage can be output.

DETAILED DESCRIPTION

Embodiment 1

Figure 1:
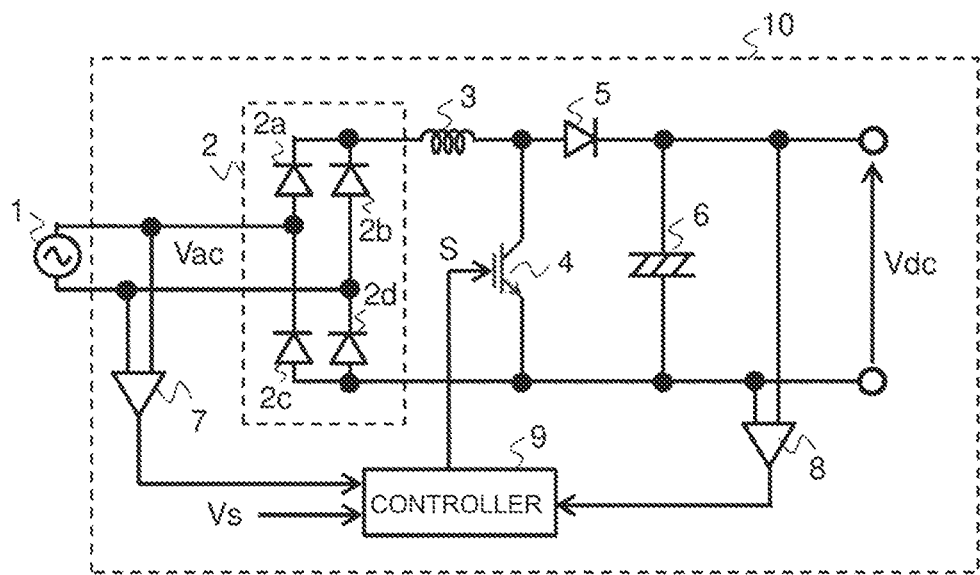
FIG. 1 is a circuit configuration diagram illustrating an example configuration of a direct-current power supply apparatus according to Embodiment 1.

A configuration of a direct-current power supply apparatus according to Embodiment 1 will be described. FIG. 1 is a circuit configuration diagram illustrating an example configuration of the direct-current power supply apparatus according to Embodiment 1. A direct-current power supply apparatus 10 includes a rectifier circuit 2, a switch 4, a smoothing capacitor 6, a zero crossing detector 7, a direct-current voltage detector 8, and a controller 9. Although FIG. 1 illustrates the case where the rectifier circuit 2 is a bridge rectifier circuit including rectifier diodes 2a to 2d, the rectifier circuit 2 is not limited to the bridge rectifier circuit. A target direct-current voltage Vs, which is a target value of a direct-current voltage Vdc output from the direct-current power supply apparatus 10, is input to the controller 9 from the outside.

The rectifier circuit 2 is connected on an output side of an alternating-current power supply 1 and subjects a power-supply voltage Vac output from the alternating-current power supply 1 to full-wave rectification. The switch 4 is connected in parallel with two lines on an output side of the rectifier circuit 2. Of the two lines on the output side of the rectifier circuit 2, a reactor 3 is connected to a higher-voltage line. The reactor 3 improves a power factor and reduces high harmonics. The smoothing capacitor 6 is connected in parallel with two lines on an output side of the switch 4.

The switch 4 is connected between the output side of the rectifier circuit 2 and an input side of the smoothing capacitor. A voltage full-wave rectified by the rectifier circuit 2 is applied to the switch 4 via the reactor 3. The switch 4 is connected to the controller 9 via a signal line (not illustrated). The switch 4 performs an on switching operation and an off switching operation in response to a control signal input from the controller 9. When the switch 4 performs the on switching operation, the two lines on the output side of the rectifier circuit 2 are short-circuited. When the switch 4 performs the off switching operation, the two lines on the output side of the rectifier circuit 2 are open-circuited. The switch 4 short-circuits and open-circuits the two lines on the output side of the rectifier circuit 2.

Of the two lines on the output side of the switch 4, a diode 5 is connected to a higher-voltage line. The diode 5 inhibits a current discharged from the smoothing capacitor 6 from flowing toward the switch 4. A direct-current voltage Vdc is output to an output side of the smoothing capacitor 6. On the output side of the smoothing capacitor 6, a load, which is not illustrated, is connected, and the direct-current voltage Vdc is supplied to the load.

The zero crossing detector 7 is connected on the output side of the alternating-current power supply 1. The zero crossing detector 7 detects a zero crossing point of the power-supply voltage Vac output from the alternating-current power supply 1. The zero crossing point is a point at which the power-supply voltage Vac changes between negative and positive voltages. The direct-current voltage detector 8 is connected on the output side of the smoothing capacitor 6. The direct-current voltage detector 8 detects the direct-current voltage Vdc output from the smoothing capacitor 6. The zero crossing detector 7 and the direct-current voltage detector 8 are connected to the controller 9. When the zero crossing detector 7 detects a zero crossing point, the zero crossing detector 7 outputs a zero crossing signal, which is a signal representing that the zero crossing point has been detected, to the controller 9. The direct-current voltage detector 8 outputs a value of the detected direct-current voltage Vdc to the controller 9. In Embodiment 1, a zero crossing period, which is a period between zero crossing points detected by the zero crossing detector 7, is denoted by T.

Figure 2:
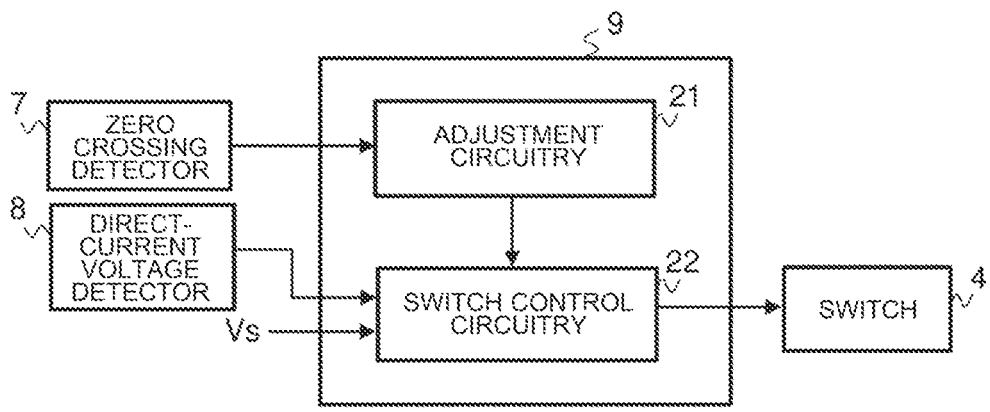
FIG. 2 is a functional block diagram illustrating an example configuration of a controller illustrated in FIG. 1.

A configuration of the controller 9 illustrated in FIG. 1 will be described. FIG. 2 is a functional block diagram illustrating an example configuration of the controller illustrated in FIG. 1. The controller 9 generates, on the basis of the direct-current voltage Vdc detected by the direct-current voltage detector 8 and the zero crossing period T, which is a period between zero crossing points detected by the zero crossing detector 7, an on signal S, which is a control signal that causes the switch 4 to perform the on switching operation, and outputs the on signal S to the switch 4. The controller 9 includes an adjustment circuitry 21 and a switch control circuitry 22. In the controller 9, various functions are implemented by an arithmetic device, such as a microcomputer, executing software. The controller 9 may be hardware, such as a circuit device, that implements various functions.

The adjustment circuitry 21 measures a time interval between points in time when respective zero crossing signals are input from the zero crossing detector 7 by use of a timer (not illustrated) to calculate a zero crossing period T. Subsequently, the adjustment circuitry 21 calculates a zero crossing average period Tave, which is an average value of zero crossing periods T, and stores the zero crossing average period Tave. For example, the controller 9 includes a memory, which is not illustrated, and the adjustment circuitry 21 causes the memory (not illustrated) to store values of a plurality of zero crossing periods T detected in a predetermined fixed time period and calculates a zero crossing average period Tave by use of the stored plurality of zero crossing periods T. Subsequently, the adjustment circuitry 21 causes the memory (not illustrated) to store the zero crossing average period Tave. The adjustment circuitry 21 updates the zero crossing average period Tave stored by the memory (not illustrated) to a latest value over time.

Furthermore, the adjustment circuitry 21 sets a switching period Ts such that timing of the on switching operation of the switch 4 falls between the zero crossing period T based on a zero crossing signal input from the zero crossing detector 7 and the zero crossing average period Tave. The switching period Ts is a period of the on signal S output to the switch 4. For example, the adjustment circuitry 21 sets the switching period Ts to achieve a relationship represented by the following Expression (1). In Expression (1), note that the range of k is 0<k<1, and (t) means that a value with (t) is a latest value.

$$Ts(t)=Tave(t)+k(T(t)-Tave(t)) \quad (1)$$

The switch control circuitry 22 outputs the on signal S to the switch 4 in accordance with the switching period Ts set by the adjustment circuitry 21. Furthermore, the switch control circuitry 22 compares the target direct-current voltage Vs with the direct-current voltage Vdc detected by the direct-current voltage detector 8. Subsequently, the switch control circuitry 22 calculates an on signal width Ton representing a length of time during which the switch 4 is caused to perform the on switching operation such that a deviation between the target direct-current voltage Vs and the direct-current voltage Vdc approaches zero with reference to the target direct-current voltage Vs. The on signal width Ton corresponds to a time period during which the switch control circuitry 22 outputs the on signal S to the switch 4. The switch control circuitry 22 outputs the on signal S to the switch 4 for the duration of the on signal width Ton in accordance with the switching period Ts set by the adjustment circuitry 21.

Figure 3:
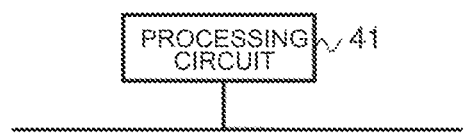
FIG. 3 is a hardware configuration diagram illustrating an example configuration of the controller illustrated in FIG. 2.

Here, an example of hardware of the controller 9 illustrated in FIG. 2 will be described. FIG. 3 is a hardware configuration diagram illustrating an example configuration of the controller illustrated in FIG. 2. In a case where various functions of the controller 9 are executed by hardware, the controller 9 illustrated in FIG. 2 is a processing circuit 41 as illustrated in FIG. 3. Functions of the adjustment circuitry 21 and the switch control circuitry 22 illustrated in FIG. 2 are implemented by the processing circuit 41.

In a case where each function is executed by hardware, the processing circuit 41 corresponds to, for example, a single circuit, a complex circuit, a programmed processor, a parallel programmed processor, an Application Specific Integrated Circuit (ASIC), a Field-Programmable Gate Array (FPGA), or a combination of these components. Functions of the circuitries, which are the adjustment circuitry 21 and the switch control circuitry 22, may be implemented by respective processing circuits 41. Alternatively, the functions of the circuitries, which are the adjustment circuitry 21 and the switch control circuitry 22, may be implemented by one processing circuit 41.

Figure 4:
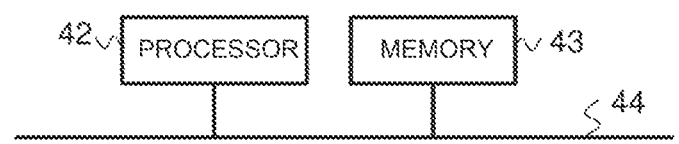
FIG. 4 is a hardware configuration diagram illustrating another example configuration of the controller illustrated in FIG. 2.

Furthermore, an example of other hardware of the controller 9 illustrated in FIG. 2 will be described. FIG. 4 is a hardware configuration diagram illustrating another example configuration of the controller illustrated in FIG. 2. In a case where various functions of the controller 9 are executed by software, the controller 9 illustrated in FIG. 2 is formed by a processor 42, such as a Central Processing Unit (CPU), and a memory 43. Functions of the adjustment circuitry 21 and the switch control circuitry 22 are implemented by the processor 42 and the memory 43. FIG. 4 illustrates the processor 42 and the memory 43 that are connected to each other in such a manner that they can communicate with each other via a bus 44. The memory 43 also serves to store a zero crossing average period Tave.

In a case where each function is executed by software, the functions of the adjustment circuitry 21 and the switch control circuitry 22 are implemented by software, firmware, or a combination of software and firmware. Software and firmware are written as programs and stored in the memory 43. The processor 42 reads out a program stored in the memory 43 and executes the program to thereby implement a function of each unit.

As examples of the memory 43, non-volatile semiconductor memories, such as a Read Only Memory (ROM), a flash memory, an Erasable and Programmable ROM (EPROM), and an Electrically Erasable and Programmable ROM (EEPROM), are used. Furthermore, as the memory 43, a volatile semiconductor memory, such as a Random Access Memory (RAM), may be used. Additionally, as the memory 43, detachable recording media, such as a magnetic disk, a flexible disk, an optical disc, a Compact Disc (CD), a Mini Disc (MD), and a Digital Versatile Disc (DVD), may be used.

Although FIG. 1 illustrates the example configuration in which the reactor 3 is connected to a line connecting the rectifier circuit 2 and the switch 4, the position of the reactor 3 is not limited to the case illustrated in FIG. 1. For example, the reactor 3 may be connected to a line connected to the alternating-current power supply 1, and the reactor 3 may be provided to any position as long as the reactor 3 is provided closer to the alternating-current power supply 1 than is the switch 4.

Next, basic operation of the direct-current power supply apparatus 10 will be described. Here, the basic operation in a case where a period between zero crossing points of a power-supply voltage Vac output from the alternating-current power supply 1 does not vary will be described. The power-supply voltage Vac supplied from the alternating-current power supply 1 is input to the rectifier circuit 2. The rectifier circuit 2 subjects the input alternating-current power-supply voltage Vac to full-wave rectification and outputs the voltage. The rectified voltage is smoothed by the smoothing capacitor 6 through the reactor 3 into a direct-current voltage Vdc.

The zero crossing detector 7 detects a zero crossing point of the power-supply voltage Vac supplied from the alternating-current power supply 1 and outputs a zero crossing signal to the controller 9. The direct-current voltage detector 8 detects a direct-current voltage Vdc, which is a voltage across the smoothing capacitor 6, and outputs a value representing the direct-current voltage Vdc to the controller 9.

The adjustment circuitry 21 uses a zero crossing period T obtained from a zero crossing signal input from the zero crossing detector 7 and a zero crossing average period Tave to determine a switching period Ts by use of Expression (1). Here, the period between zero crossing points has not varied, and thus, in Expression (1), Tave(t)=T(t) is satisfied. Hence, the adjustment circuitry 21 sets the switching period Ts at Ts(t)=Tave(t)=T(t). The switch control circuitry 22 calculates an on signal width Ton that causes the direct-current voltage Vdc to approach the target direct-current voltage Vs. Subsequently, the switch control circuitry 22 outputs an on signal S including information about the on signal width Ton to the switch 4 for the duration of the on signal width Ton at the timing of a latest zero crossing period (t). The switch 4 performs an opening and closing operation such that the switch 4 performs the on switching operation in accordance with the on signal S input from the controller 9 and the off switching operation at the end of the on signal width Ton.

Figure 5:
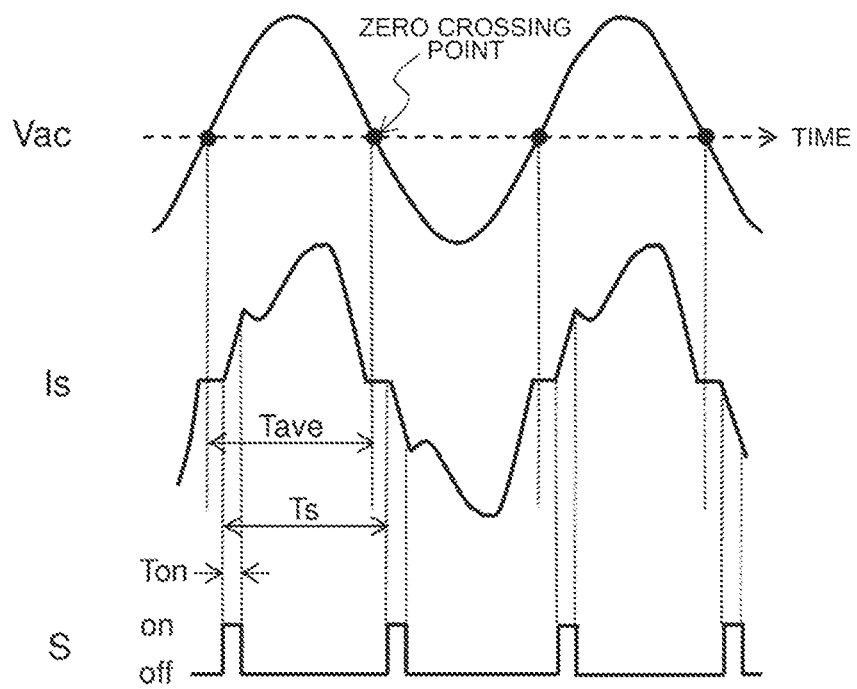
FIG. 5 illustrates operation of a switch in a case of basic operation of the direct-current power supply apparatus according to Embodiment 1.

FIG. 5 illustrates operation of the switch in a case of the basic operation of the direct-current power supply apparatus according to Embodiment 1. FIG. 5 is a graph illustrating changes over time each in the power-supply voltage Vac of the alternating-current power supply 1, a current Is flowing through the reactor 3, and the on signal S of the switch 4. As indicated by a change over time in a zero crossing point of the power-supply voltage Vac and a change over time in the on signal S of the switch 4, the switch 4 performs the on switching operation in accordance with the control signal output from the controller 9 to the switch 4. When the switch 4 performs the on switching operation, the two lines on the output side of the rectifier circuit 2 enter a short-circuited state. When the two lines on the output side of the rectifier circuit 2 enter the short-circuited state, a short-circuit current flows from the alternating-current power supply 1 through the rectifier circuit 2, the reactor 3, and the switch 4, and then flows through the rectifier circuit 2 again to the alternating-current power supply 1. As indicated by the current Is in FIG. 5, the short-circuit current turns into an input current with a sharp-pointed shape. The short-circuit operation of the switch 4 improves an input power factor and reduces a high harmonic current. For example, a value of a high harmonic current can be reduced to not more than a fixed value.

Figure 6:
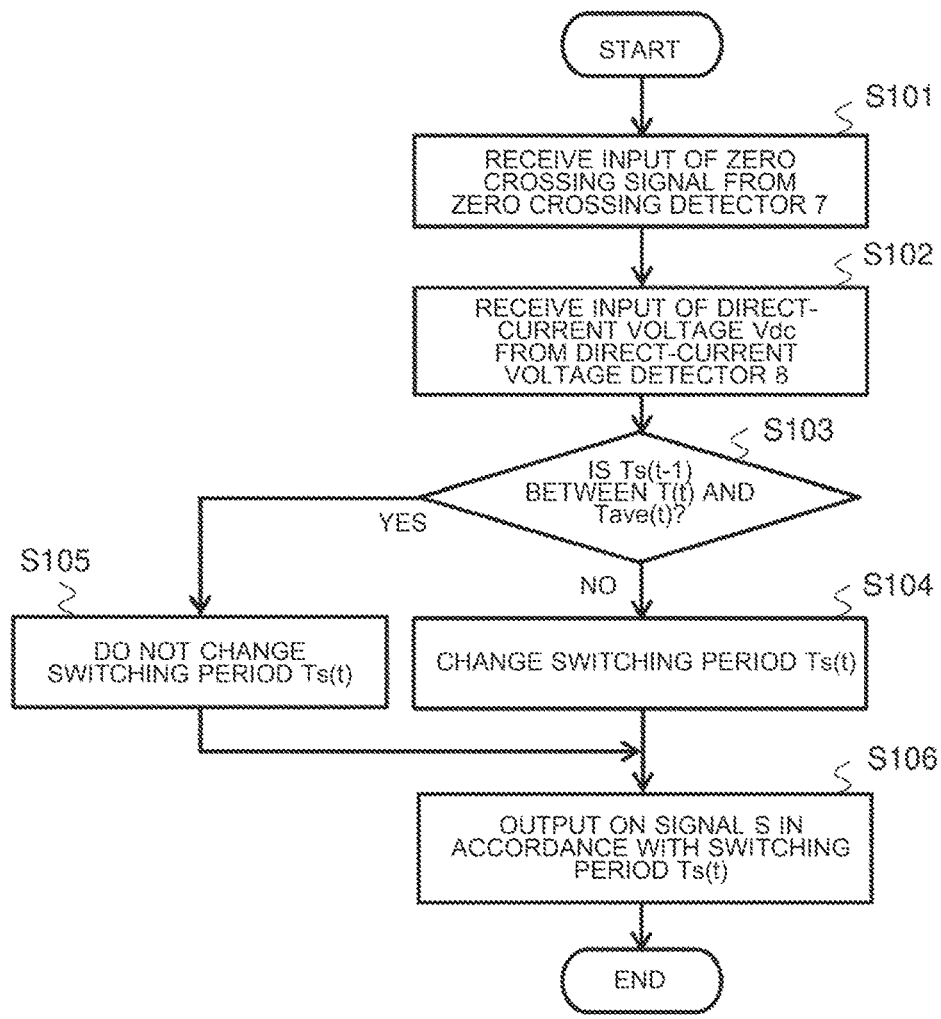
FIG. 6 is a flowchart illustrating an operation procedure performed by the direct-current power supply apparatus according to Embodiment 1.
Figure 7:
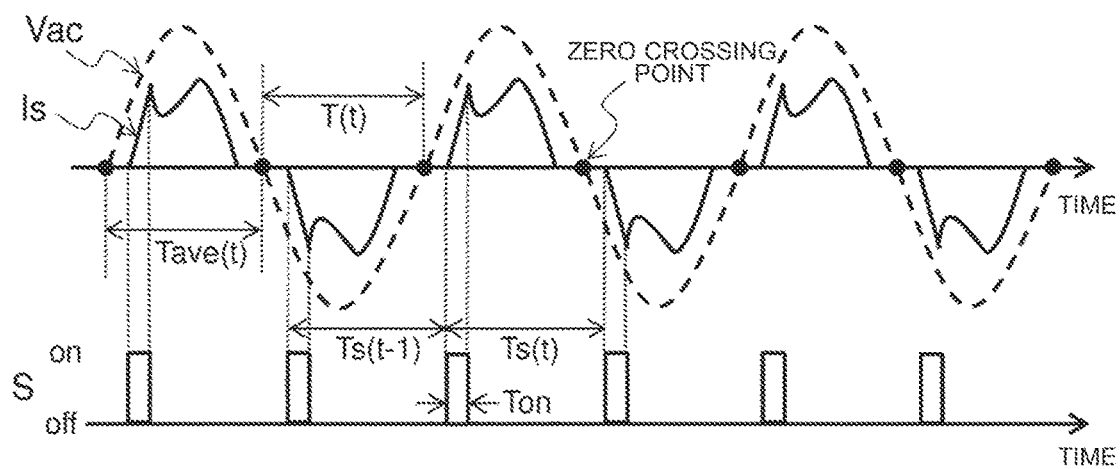
FIG. 7 illustrates an example of a case where a switching period is corrected when a period between zero crossing points of a direct-current power supply varies in Embodiment 1.

Next, operation of the direct-current power supply apparatus 10 in a case where the period between zero crossing points of the power-supply voltage Vac varies will be described. FIG. 6 is a flowchart illustrating an operation procedure performed by the direct-current power supply apparatus according to Embodiment 1. FIG. 7 illustrates an example of a case where a switching period is corrected when a period between zero crossing points of a direct-current power supply varies in Embodiment 1. FIG. 7 illustrates changes over time each in the power-supply voltage Vac of the alternating-current power supply 1, the current Is flowing through the reactor 3, and the on signal S of the switch 4. The controller 9 executes a flow illustrated in FIG. 6 at fixed intervals. The controller 9 executes the flow illustrated in FIG. 6, for example, at a point in time when the controller 9 receives a zero crossing signal from the zero crossing detector 7.

When the zero crossing detector 7 detects a zero crossing point of the power-supply voltage Vac supplied from the alternating-current power supply 1, the zero crossing detector 7 outputs a zero crossing signal to the controller 9. When the direct-current voltage detector 8 detects a direct-current voltage Vdc, which is a voltage across the smoothing capacitor 6, the direct-current voltage detector 8 outputs a value representing the direct-current voltage Vdc to the controller 9. When the adjustment circuitry 21 receives input of the zero crossing signal from the zero crossing detector 7 (step S101), the adjustment circuitry 21 calculates a latest zero crossing period T(t). When the switch control circuitry 22 receives input of the value representing the direct-current voltage Vdc from the direct-current voltage detector 8 (step S102), the switch control circuitry 22 calculates an on signal width Ton such that the direct-current voltage Vdc coincides with the target direct-current voltage Vs.

To determine a subsequent switching period Ts(t), the adjustment circuitry 21 determines whether or not a condition of Expression (1) is met. Specifically, the adjustment circuitry 21 determines whether or not a switching period Ts(t−1) that is being used is a value between the latest zero crossing period T(t) and a latest zero crossing average period Tave(t) (step S103). As a result of the determination made in step S103, when the switching period Ts(t−1) is not between the latest zero crossing period T(t) and the latest zero crossing average period Tave(t), the adjustment circuitry 21 changes the subsequent switching period Ts(t) to a value different from the switching period Ts(t−1) (step S104). Specifically, the adjustment circuitry 21 changes the subsequent switching period Ts(t) to a value that satisfies Expression (1). The adjustment circuitry 21 transmits information about the changed switching period Ts(t) to the switch control circuitry 22.

On the other hand, as a result of the determination made in step S103, when the switching period Ts(t−1) is a value between the latest zero crossing period T(t) and the latest zero crossing average period Tave(t), the adjustment circuitry 21 does not change the switching period Ts(t) (step S105). The adjustment circuitry 21 transmits, to the switch control circuitry 22, information that the subsequent switching period Ts(t) is to be maintained at the same value as the value of the switching period Ts(t−1).

The switch control circuitry 22 outputs an on signal S to the switch 4 for the duration of the calculated on signal width Ton in accordance with the switching period Ts(t) set by the adjustment circuitry 21 (step S106).

Thus, even when the period between zero crossing points varies, a correction is made by following a variation in the zero crossing period T such that timing of the on switching operation of the switch 4 falls between the latest zero crossing period T and the zero crossing average period Tave. The switch 4 performs the on switching operation reliably in response to the zero crossing period that has varied. Thus, switching of the switch 4 can be kept from significantly deviating from an ideal switching timing. As a result, even when timing of zero crossing points varies because of power-supply voltage distortions or frequency variations, a direct-current voltage Vdc to be output can be kept from reaching an overvoltage or rising insufficiently.

The direct-current power supply apparatus 10 according to Embodiment 1 includes the rectifier circuit 2 that rectifies a power-supply voltage Vac, the smoothing capacitor 6 that smooths an output voltage of the rectifier circuit 2 and outputs a direct-current voltage Vdc, the switch 4 connected between the output side of the rectifier circuit 2 and the input side of the smoothing capacitor 6, the zero crossing detector 7 that detects a zero crossing point of the power-supply voltage Vac, and the controller 9. The controller 9 generates, on the basis of a zero crossing period T, which is a period for the zero crossing point detected by the zero crossing detector 7, an on signal S, which is a control signal that causes the switch 4 to perform an on switching operation. The controller 9 includes the adjustment circuitry 21 and the switch control circuitry 22. The adjustment circuitry 21 sets a switching period Ts such that timing of the on switching operation of the switch 4 falls between the zero crossing period T and a zero crossing average period Tave. The switch control circuitry 22 outputs the on signal S to the switch 4 in accordance with the switching period Ts set by the adjustment circuitry 21.

In Embodiment 1, the switching period Ts is set such that the timing of the on switching operation of the switch 4 falls between the zero crossing period T based on detection values of the zero crossing detector 7 and the zero crossing average period Tave. Thus, even when timing of zero crossing points varies because of power-supply voltage distortions or frequency variations, the influence of a variation in the timing of zero crossing points on the direct-current voltage Vdc is reduced. As a result, the likelihoods of an excessive rise and an insufficient rise in the direct-current voltage Vdc are reduced, and a stable direct-current voltage Vdc can be output.

Embodiment 2

In Embodiment 1, when a period between zero crossing points of the power-supply voltage Vac of the alternating-current power supply 1 varies, timing of an on switching operation of the switch 4 is corrected. In Embodiment 2, when a variation in the period between zero crossing points is large, the direct-current voltage Vdc is stabilized by adjusting not only the timing of the on switching operation of the switch 4, but also an on signal width. In Embodiment 2, components that are the same as those in Embodiment 1 are denoted by the same reference signs, and a detailed description of the components is omitted. Furthermore, a detailed description of operations similar to operations described in Embodiment 1 is omitted.

A configuration of the controller 9 in the direct-current power supply apparatus 10 according to Embodiment 2 will be described with reference to FIG. 2. The adjustment circuitry 21 transmits information about a zero crossing period T and a zero crossing average period Tave to the switch control circuitry 22. In Embodiment 2, a description will be given on a case where Tave is a zero crossing average period before a variation in a frequency f of the power-supply voltage Vac and that T is a zero crossing period after the variation in the frequency f of the power-supply voltage Vac. When the switch control circuitry 22 receives information about the zero crossing period T and the zero crossing average period Tave from the switch control circuitry 22, the switch control circuitry 22 sets, by use of Expressions (2) and (3), an on signal width Ton(t) of a subsequent on signal S to be output to the switch 4.

When $(T-Tave)<0$ is satisfied, $Ton(t)<Ton(t-1)$ (2)

When $(T-Tave)>0$ is satisfied, $Ton(t)>Ton(t-1)$ (3)

That is, when T<Tave is satisfied, the switch control circuitry 22 sets, by use of Expression (2), the on signal width Ton(t) of the subsequent on signal S to be output to the switch 4 at a value smaller than an on signal width Ton(t−1) last set. Furthermore, when T>Tave is satisfied, the switch control circuitry 22 sets, by use of Expression (3), the on signal width Ton(t) of the subsequent on signal S to be output to the switch 4 at a value larger than the on signal width Ton(t−1) last set. When T=Tave is satisfied, the switch control circuitry 22 maintains the on signal width Ton(t) at the on signal width Ton(t−1) last set.

Incidentally, in a case where the switch control circuitry 22 changes the on signal width Ton(t) to a value different from the on signal width Ton(t−1), the switch control circuitry 22 may calculate an on signal width Ton(t) by use of a correction value proportional to a difference between the zero crossing period T and the zero crossing average period Tave. For example, in a case where j is a coefficient, for the case of Expression (2), an expression $Ton(t)=Ton(t-1)-j\times(Tave-T)/Tave$ is applied. Furthermore, for the case of Expression (3), an expression $Ton(t)=Ton(t-1)+j\times(T-Tave)/Tave$ is applied.

Figure 8:
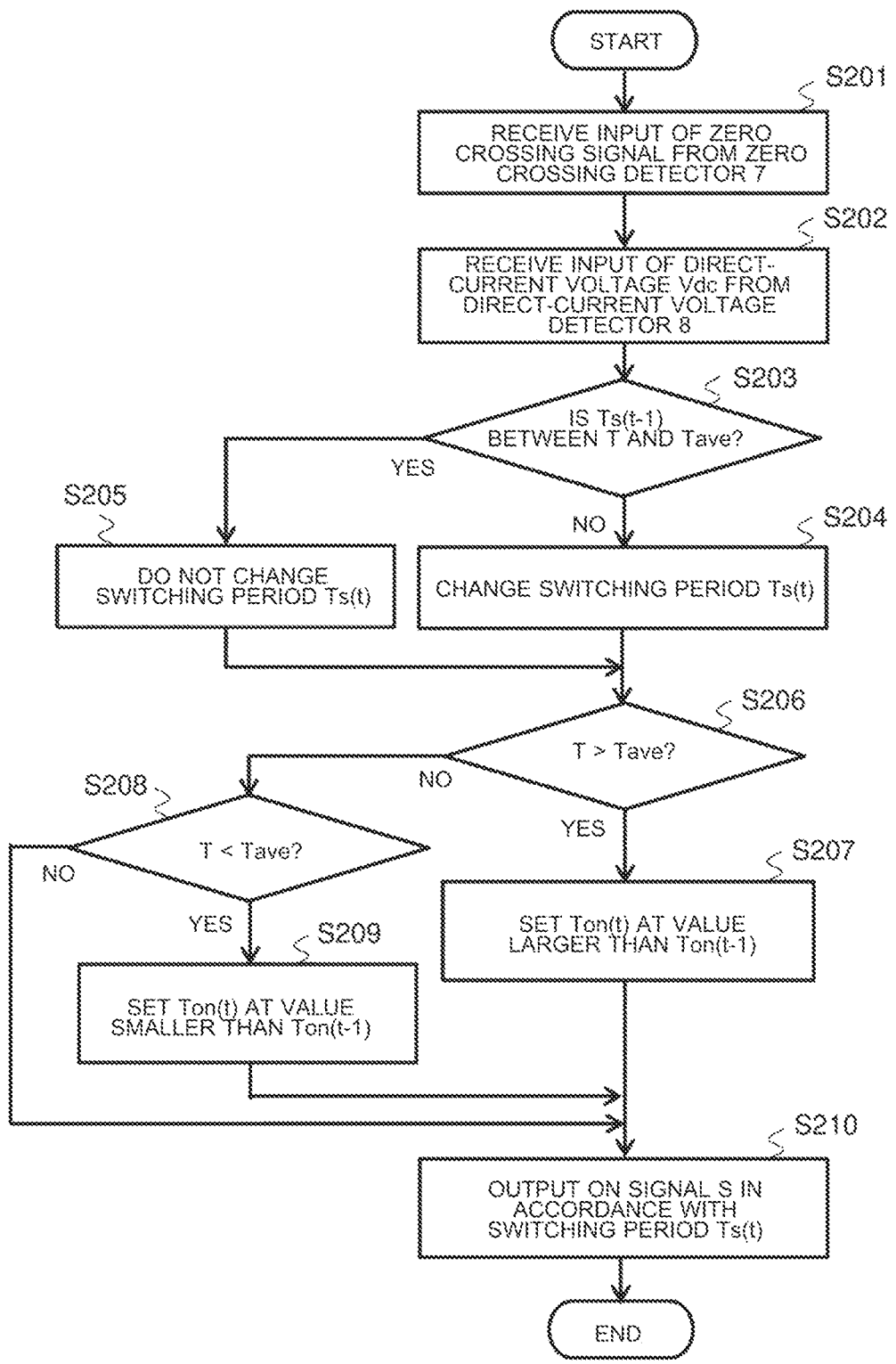
FIG. 8 is a flowchart illustrating an operation procedure performed by the direct-current power supply apparatus according to Embodiment 2.

Next, an operation procedure performed by the direct-current power supply apparatus 10 according to Embodiment 2 in a case where the period between zero crossing points of the power-supply voltage Vac output from the alternating-current power supply 1 varies will be described. FIG. 8 is a flowchart illustrating the operation procedure performed by the direct-current power supply apparatus according to Embodiment 2. FIG. 8 illustrates a case where the controller 9 performs the operation described with reference to Embodiment 1 and then performs an operation to be described in Embodiment 2. Steps S201 to S205 and S210 illustrated in FIG. 8 are similar to steps S101 to S106 described with reference to FIG. 6, and thus a detailed description of these steps is omitted.

After step S204, the switch control circuitry 22 determines whether or not T>Tave is satisfied (step S206). As a result of the determination made in step S206, when T>Tave is satisfied, the switch control circuitry 22, the switch control circuitry 22 sets an on signal width Ton(t) of a subsequent on signal S at a value larger than an on signal width Ton(t−1) last set (step S207). Thus, the on signal width Ton(t) is corrected to be longer than the on signal width Ton(t−1) corresponding to a zero crossing period before a variation in the frequency f. An increase in the on signal width Ton increases a current Is that flows through the reactor 3 at a time, and thus the amount of rise in the direct-current voltage Vdc increases even when an interval between on signals S is lengthened.

On the other hand, as a result of the determination made in step S206, when T>Tave is not satisfied, the switch control circuitry 22 determines whether or not T<Tave is satisfied (step S208). As a result of the determination made in step S208, when T<Tave is satisfied, the switch control circuitry 22 sets the on signal width Ton(t) of the subsequent on signal S at a value smaller than the on signal width Ton(t−1) last set (step S209). Thus, the on signal width Ton(t) is corrected to be shorter than the on signal width Ton(t−1) corresponding to the zero crossing period before the variation in the frequency f. A reduction in the on signal width Ton reduces the current Is that flows through the reactor 3 at a time, and thus the amount of rise in the direct-current voltage Vdc can be reduced even when the interval between on signals S is shortened. When the on signal width Ton is adjusted in this manner, a change in the direct-current voltage Vdc can be moderated for a variation in the zero crossing period.

As a result of the determination made in step S208, when T<Tave is not satisfied, the switch control circuitry 22 maintains the on signal width Ton(t) of the subsequent on signal S at the on signal width Ton(t−1) last set and proceeds to step S210. When a variation in the zero crossing period is small, the adjustment circuitry 21 controls timing of the on switching operation of the switch 4 (step S204), the influence of the variation on the direct-current voltage Vdc is thus reduced, and the on signal width Ton does not have to be changed.

Figure 9:
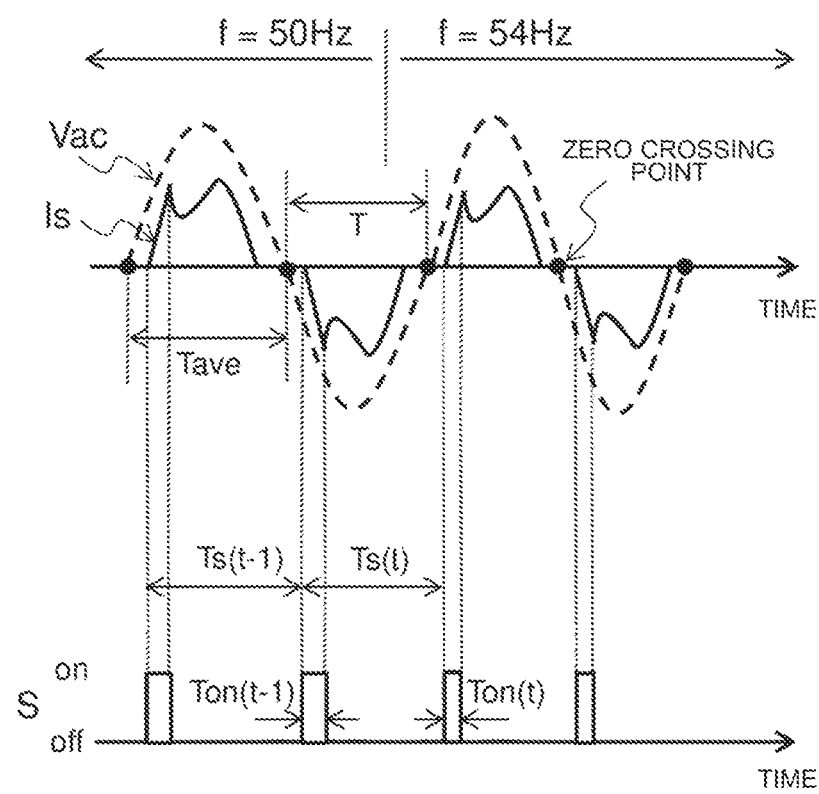
FIG. 9 is a timing chart illustrating an example of a case where a zero crossing period varies in Embodiment 2.

FIG. 9 is a timing chart illustrating an example of a case where a zero crossing period varies in Embodiment 2. FIG. 9 illustrates a case where the frequency f of the power-supply voltage Vac varies from 50 Hz to 54 Hz suddenly. FIG. 9 illustrates changes over time each in the power-supply voltage Vac of the alternating-current power supply 1, the current Is flowing through the reactor 3, and the on signal S of the switch 4.

When the frequency f of the power-supply voltage Vac varies from 50 Hz to 54 Hz, the zero crossing period T is reduced to be shorter than the zero crossing average period Tave. That is, a relationship between the zero crossing period T and the zero crossing average period Tave is T<Tave. As a result of the determination made in step S203 illustrated in FIG. 8, when the adjustment circuitry 21 proceeds to the operation in step S204, a subsequent switching period Ts(t) is reduced to be smaller than the zero crossing average period Tave. That is, the timing of the on switching operation of the switch 4 is earlier than that for the zero crossing period that has not yet varied. For this reason, as described in Embodiment 1, the current Is flows through the reactor 3 at a point in time when the power-supply voltage Vac is lower in level, and thus the amount of rise in the direct-current voltage Vdc can be reduced.

Furthermore, because of the relationship of T<Tave, in step S209 illustrated in FIG. 8, the on signal width Ton(t) is corrected such that a relationship of Ton(t)<Ton(t−1) is satisfied. That is, the on signal width Ton(t) is corrected to be shorter than the on signal width Ton(t−1) corresponding to the zero crossing period before the variation in the frequency f. A reduction in the on signal width Ton reduces the current Is that flows through the reactor 3 at a time, and thus the amount of rise in the direct-current voltage Vdc can be reduced even when the interval between on signals S is shortened by the variation in the frequency f from 50 Hz to 54 Hz.

Here, as a specific example, the case has been described with reference to FIG. 9 where the frequency f of the power-supply voltage Vac varies from 50 Hz to 54 Hz suddenly and then the latest zero crossing period T is reduced to be shorter than the zero crossing average period Tave. However, Embodiment 2 is not limited to this case. In contrast to the example illustrated in FIG. 9, the control method described with reference to FIG. 8 can also be applied to a case where the frequency f of the power-supply voltage Vac is low. In this case, the latest zero crossing period T is increased to be longer than the zero crossing average period Tave, and control can be exercised in which the amount of rise in the direct-current voltage Vdc is increased.

In a case where a variation in the period between zero crossing points of the power-supply voltage Vac of the alternating-current power supply 1 is large, even when the timing of the on switching operation of the switch 4 is controlled, the direct-current voltage Vdc is sometimes unable to be caused to approach the target direct-current voltage Vs. In Embodiment 2, even when the variation in the period between zero crossing points of the power-supply voltage Vac is large, the direct-current voltage Vdc can be kept from reaching an overvoltage or rising insufficiently, and the direct-current voltage Vdc can be stabilized.

Embodiment 3

In Embodiment 3, an on signal width is adjusted by use of a control method different from the control method described in Embodiment 2. In Embodiment 3, in particular, the direct-current voltage Vdc is kept from reaching an overvoltage. In Embodiment 3, components that are the same as those in Embodiment 1 are denoted by the same reference signs, and a detailed description of the components is omitted. Furthermore, a detailed description of operations similar to operations described in Embodiment 1 is omitted.

A configuration of the controller 9 in the direct-current power supply apparatus 10 according to Embodiment 3 will be described with reference to FIG. 2. The switch control circuitry 22 compares the direct-current voltage Vdc detected by the direct-current voltage detector 8 with a first threshold value Vth1, which is a predetermined voltage. The first threshold value Vth1 is a value for the direct-current voltage Vdc and is a criterion for determining whether or not control has to be exercised in which the direct-current voltage Vdc is reduced in a stepwise manner. When the direct-current voltage Vdc is larger than the first threshold value Vth1, the switch control circuitry 22 repeats a correction operation of subtracting a predetermined correction value ΔT from a calculated on signal width Ton until the direct-current voltage Vdc becomes smaller than or equal to the first threshold value Vth1.

When the direct-current voltage Vdc does not become smaller than or equal to the first threshold value Vth1 and reaches a predetermined second threshold value Vth2, the switch control circuitry 22 stops outputting the on signal S to the switch 4. The second threshold value Vth2 is a value for the direct-current voltage Vdc and is a criterion for determining whether or not the direct-current voltage Vdc is an overvoltage. A relationship among the target direct-current voltage Vs, the first threshold value Vth1, and the second threshold value Vth2 is Vs<Vth1<Vth2.

Furthermore, when the direct-current voltage Vdc does not become smaller than or equal to the first threshold value Vth1 and the number of times Cr the correction operation has been performed reaches a predetermined maximum number Cmax, the switch control circuitry 22 stops outputting the on signal S to the switch 4. The maximum number Cmax is a value for the number of times Cr the correction operation has been performed and is a criterion for determining whether or not the direct-current voltage Vdc is an overvoltage.

The controller 9 stores the first threshold value Vth1, the second threshold value Vth2, the correction value ΔT, and the maximum number Cmax. For example, in a case where the configuration of the controller 9 is the hardware configuration illustrated in FIG. 8, the memory 43 stores the first threshold value Vth1, the second threshold value Vth2, the correction value ΔT, and the maximum number Cmax.

Figure 10:
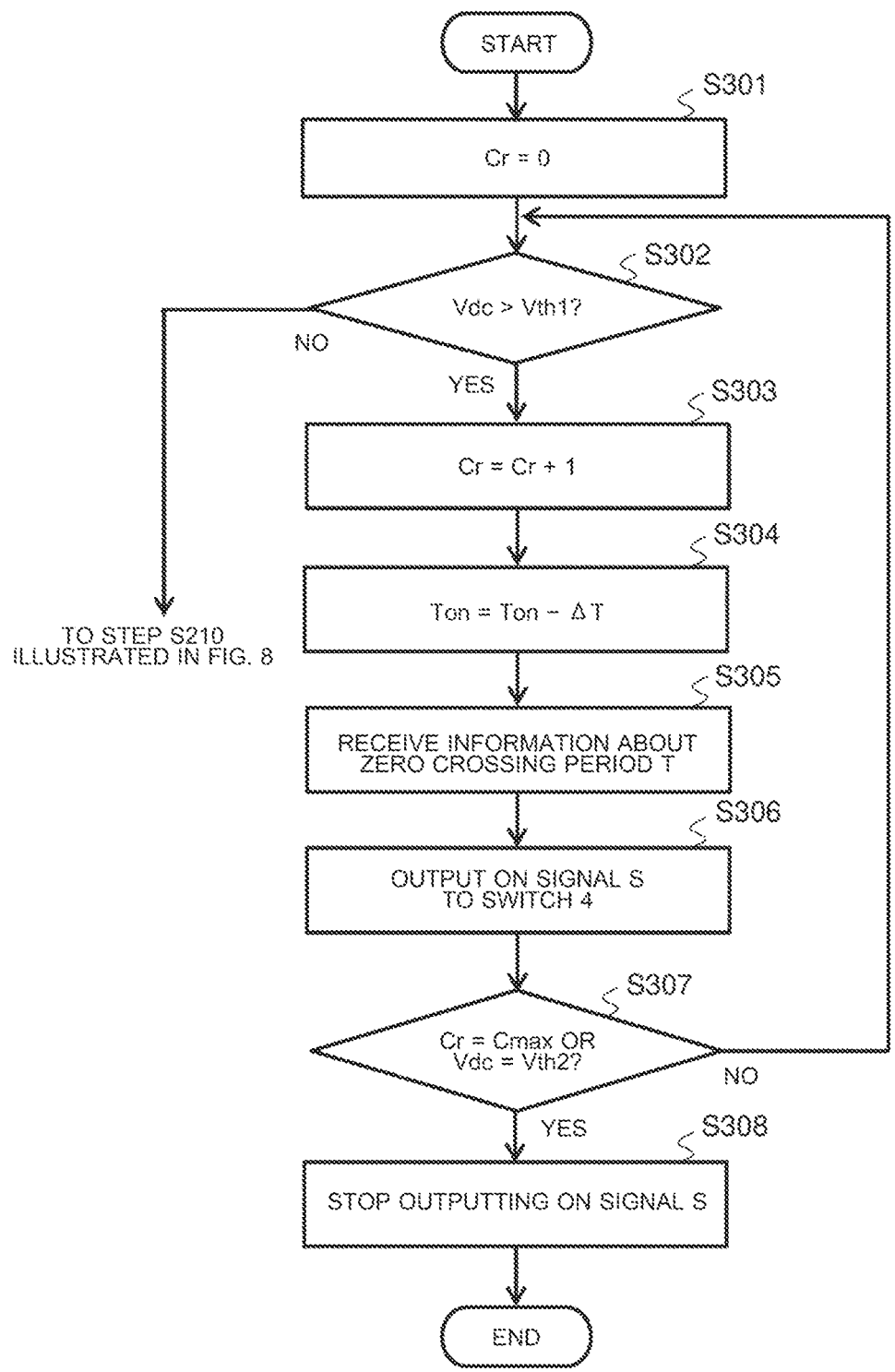
FIG. 10 is a flowchart illustrating an operation procedure performed by the direct-current power supply apparatus according to Embodiment 3.

Next, an operation procedure performed by the direct-current power supply apparatus 10 according to Embodiment 3 will be described. FIG. 10 is a flowchart illustrating the operation procedure performed by the direct-current power supply apparatus according to Embodiment 3. In Embodiment 3, as in Embodiment 2, the controller 9 performs the operation described with reference to Embodiment 1 and then performs an operation illustrated in FIG. 10. That is, in the flow illustrated in FIG. 8, the controller 9 performs steps S301 to S308 illustrated in FIG. 10 in place of steps S206 to S209. Incidentally, steps S201 to S205 and S210 illustrated in FIG. 8 are similar to steps S101 to S106 described with reference to FIG. 6, and thus a detailed description of these steps is omitted.

The switch control circuitry 22 calculates an on signal width Ton such that the direct-current voltage Vdc coincides with the target direct-current voltage Vs and sets the number of times Cr the correction operation has been performed=0 (step S301). Subsequently, the switch control circuitry 22 determines whether or not the direct-current voltage Vdc detected by the direct-current voltage detector 8 is larger than the first threshold value Vth1 (step S302). As a result of the determination made in step S302, when the direct-current voltage Vdc is smaller than or equal to the first threshold value Vth1, the switch control circuitry 22 proceeds to step S210 illustrated in FIG. 8. On the other hand, as a result of the determination made in step S302, when the direct-current voltage Vdc is larger than the first threshold value Vth1, the switch control circuitry 22 adds 1 to the number of times Cr the correction operation has been performed and sets a calculated result as a new number of times Cr (step S303). Subsequently, the switch control circuitry 22 performs the correction operation of subtracting the correction value ΔT from the calculated on signal width Ton. The switch control circuitry 22 sets a result of the correction operation as a new on signal width Ton (step S304).

Subsequently, when the switch control circuitry 22 receives information about a zero crossing period T from the adjustment circuitry 21 (step S305), the switch control circuitry 22 outputs an on signal S to the switch 4 for the duration of the on signal width Ton calculated in step S304 on the basis of the zero crossing period T (step S306). Subsequently, the switch control circuitry 22 determines whether or not the direct-current voltage Vdc has reached the second threshold value Vth2 or determines whether or not the number of times Cr the correction operation has been performed has reached the maximum number Cmax (step S307). As a result of the determination made in step S307, when the direct-current voltage Vdc does not reach the second threshold value Vth2 and the number of times Cr the correction operation has been performed does not reach the maximum number Cmax, the switch control circuitry 22 returns to step S302. On the other hand, as a result of the determination made in step S307, when the direct-current voltage Vdc reaches the second threshold value Vth2, or when the number of times Cr the correction operation has been performed reaches the maximum number Cmax, the switch control circuitry 22 determines that an anomaly has occurred in which the direct-current voltage Vdc is excessively raised to reach an overvoltage. The switch control circuitry 22 stops outputting the on signal S to the switch 4 (step S308).

In a case where, even when the correction operation of reducing the on signal width Ton in a stepwise manner is repeated up to a certain number of times, the direct-current voltage Vdc does not become smaller than or equal to the first threshold value Vth1, the direct-current power supply apparatus 10 according to Embodiment 3 determines that an anomaly has occurred and stops switching of the switch 4. Consequently, the direct-current voltage Vdc can be kept from reaching an overvoltage, and thus the direct-current power supply apparatus 10 can be kept from failing.

Although, in Embodiments 2 and 3 described above, the cases of combinations with the control described in Embodiment 1 have been described, the control described in Embodiment 1 does not have to be exercised. Operations of controlling the on signal width Ton described in Embodiments 2 and 3 are effective for a case where the influence of a variation in the zero crossing period T on the direct-current voltage Vdc is small and the influence of a variation in the amplitude of the power-supply voltage Vac on the direct-current voltage Vdc is large.

The invention claimed is:

1. A direct-current power supply apparatus comprising:
   a rectifier circuit configured to rectify a power-supply voltage output from an alternating-current power supply;
   a smoothing capacitor configured to smooth an output voltage of the rectifier circuit and output a direct-current voltage;
   a switch connected between an output side of the rectifier circuit and an input side of the smoothing capacitor;
   a zero crossing detector configured to detect a zero crossing point of the power-supply voltage; and
   a controller configured to generate, on the basis of a zero crossing period that is a period for the zero crossing point detected by the zero crossing detector, an on signal that is a control signal that causes the switch to perform an on switching operation,
   the controller being configured to
   set a switching period that is a period of the on signal such that timing of the on switching operation of the switch falls between the zero crossing period and a zero crossing average period that is an average value of a plurality of the zero crossing periods detected in a predetermined fixed time period, and
   output the on signal to the switch in accordance with the set switching period.

2. The direct-current power supply apparatus of claim 1, further comprising
   a voltage detector configured to detect the direct-current voltage output from the smoothing capacitor,
   wherein the controller is configured to
   calculate an on signal width that is a time period during which the on signal is output such that the direct-current voltage detected by the voltage detector coincides with a predetermined target direct-current voltage, and,
   when the zero crossing period is larger than the zero crossing average period, set the on signal width at a value larger than a last on signal width that is an on signal width of the on signal last output, and, when the zero crossing period is smaller than the zero crossing average period, set the on signal width at a value smaller than the last on signal width.

3. The direct-current power supply apparatus of claim 1, further comprising
   a voltage detector configured to detect the direct-current voltage output from the smoothing capacitor,
   wherein the controller is configured to
   calculate an on signal width that is a time period during which the on signal is output such that the direct-current voltage detected by the voltage detector coincides with a predetermined target direct-current voltage,
   when the direct-current voltage detected by the voltage detector is larger than a predetermined first threshold value, repeat a correction operation of subtracting a predetermined correction value from the on signal width until the direct-current voltage detected by the voltage detector becomes smaller than or equal to the predetermined first threshold value, and,
   when the number of times the correction operation has been performed reaches a predetermined maximum number, or when the direct-current voltage detected by the voltage detector reaches a second threshold value larger than the predetermined first threshold value, stop outputting the on signal to the switch.

4. A method of controlling a direct-current power supply apparatus including a rectifier circuit configured to rectify a power-supply voltage output from an alternating-current power supply, a smoothing capacitor configured to smooth an output voltage of the rectifier circuit and output a direct-current voltage, a switch connected between an output side of the rectifier circuit and an input side of the smoothing capacitor, and a zero crossing detector configured to detect a zero crossing point of the power-supply voltage, the method comprising:
   setting a switching period that is a period of an on signal that causes the switch to perform an on switching operation such that timing of the on switching operation of the switch falls between a zero crossing period that is a period for the zero crossing point detected by the zero crossing detector, and a zero crossing average period that is an average value of a plurality of the zero crossing periods detected in a predetermined fixed time period; and outputting the on signal to the switch in accordance with the set switching period.

5. The method of controlling the direct-current power supply apparatus of claim 4,
wherein the direct-current power supply apparatus includes a voltage detector configured to detect the direct-current voltage output from the smoothing capacitor, and
the method comprises:
before the outputting the on signal to the switch,
calculating an on signal width that is a time period during which the on signal is output such that the direct-current voltage detected by the voltage detector coincides with a predetermined target direct-current voltage; and,
when the zero crossing period is larger than the zero crossing average period, setting the on signal width at a value larger than a last on signal width that is an on signal width of the on signal last output, and, when the zero crossing period is smaller than the zero crossing average period, setting the on signal width at a value smaller than the last on signal width.

6. The method of controlling the direct-current power supply apparatus of claim 4,
wherein the direct-current power supply apparatus includes a voltage detector configured to detect the direct-current voltage output from the smoothing capacitor, and
the method comprises:
before the outputting the on signal to the switch,
calculating an on signal width that is a time period during which the on signal is output such that the direct-current voltage detected by the voltage detector coincides with a predetermined target direct-current voltage;
when the direct-current voltage detected by the voltage detector is larger than a predetermined first threshold value, repeating a correction operation of subtracting a predetermined correction value from the on signal width until the direct-current voltage detected by the voltage detector becomes smaller than or equal to the predetermined first threshold value; and,
when the number of times the correction operation has been performed reaches a predetermined maximum number, or when the direct-current voltage detected by the voltage detector reaches a second threshold value larger than the predetermined first threshold value, stopping outputting the on signal to the switch.

\* \* \* \* \*